US008272947B2

(12) United States Patent
Gagner et al.

(10) Patent No.: US 8,272,947 B2
(45) Date of Patent: Sep. 25, 2012

(54) MANAGING CASHLESS WAGERING GAME SYSTEMS

(75) Inventors: Mark B. Gagner, West Chicago, IL (US); Erhard W. Rathsack, Reno, NV (US); Jorge L. Shimabukuro, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 889 days.

(21) Appl. No.: 12/304,064

(22) PCT Filed: Jun. 8, 2007

(86) PCT No.: PCT/US2007/013649
§ 371 (c)(1),
(2), (4) Date: Dec. 9, 2008

(87) PCT Pub. No.: WO2007/146205
PCT Pub. Date: Dec. 21, 2007

(65) Prior Publication Data

US 2011/0183745 A1 Jul. 28, 2011

Related U.S. Application Data

(60) Provisional application No. 60/804,299, filed on Jun. 9, 2006, provisional application No. 60/829,188, filed on Oct. 12, 2006.

(51) Int. Cl.

| | |
|---|---|
| ***A63F 9/24*** | (2006.01) |
| ***A63F 13/12*** | (2006.01) |
| *G06F 17/00* | (2006.01) |
| *G06F 19/00* | (2006.01) |

(52) U.S. Cl. ................ 463/25; 463/29; 463/42; 463/43; 273/138.1; 273/141 A; 273/460; 709/225; 709/232; 709/237

(58) Field of Classification Search .................... 463/21, 463/25–27, 29, 40–43, 47; 273/138.1, 139, 273/138.2, 141 A, 454–456, 460; 709/203–207, 709/223–244; 714/E11.088, E11.105, E11.125; 719/325
See application file for complete search history.

(56) References Cited

U.S. PATENT DOCUMENTS

| | | | | |
|---|---|---|---|---|
| 5,265,874 A * | 11/1993 | Dickinson et al. | .............. | 463/25 |
| 5,470,079 A * | 11/1995 | LeStrange et al. | .............. | 463/25 |
| 5,674,128 A | 10/1997 | Holch et al. | | |
| 5,800,269 A | 9/1998 | Holch et al. | | |
| 5,811,772 A | 9/1998 | Lucero | | |
| 5,902,983 A * | 5/1999 | Crevelt et al. | ................ | 235/380 |

(Continued)

OTHER PUBLICATIONS

"International Application Serial No. PCT/US07/13649, Search Report and Written Opinion mailed Aug. 15, 2008", 9pgs.

*Primary Examiner* — Arthur O. Hall
(74) *Attorney, Agent, or Firm* — Schwegman Lundberg Woessner, P.A.

(57) ABSTRACT

This document discusses, among other things, systems and methods for managing of cashless wagering game systems. An apparatus comprises a first cashless wagering game media input device, operable to access a first cashless wagering game medium associated with a first cashless wagering system; a second cashless wagering game media input device, operable to access a second cashless wagering game medium associated with a second cashless wagering system; and a control module operable to: receive a transfer amount, the transfer amount associated with the first cashless wagering game medium and to be debited from the first cashless wagering system; and credit at least a portion of the transfer amount to the second cashless wagering system.

22 Claims, 13 Drawing Sheets

U.S. PATENT DOCUMENTS 6,048,269 A 4/2000 Burns et al.
6,089,982 A 7/2000 Holch et al.
6,280,328 B1 8/2001 Holch et al.
6,511,377 B1 * 1/2003 Weiss .............................. 463/25
6,547,131 B1 * 4/2003 Foodman et al. ............. 235/380
6,558,255 B2 * 5/2003 Walker et al. ................... 463/25
6,607,441 B1 * 8/2003 Acres .............................. 463/25
6,645,075 B1 11/2003 Gatto
6,652,380 B1 * 11/2003 Luciano .......................... 463/25
6,676,522 B2 1/2004 Rowe et al.
6,682,421 B1 1/2004 Rowe et al.
6,729,957 B2 5/2004 Burns et al.
6,729,958 B2 5/2004 Burns et al.
6,736,725 B2 5/2004 Burns et al.
6,739,972 B2 * 5/2004 Flanagan-Parks et al. ..... 463/25
6,746,330 B2 * 6/2004 Cannon ........................... 463/25
6,971,956 B2 12/2005 Rowe et al.
7,229,353 B2 * 6/2007 Seelig ............................. 463/25
7,232,371 B2 * 6/2007 Gatto et al. ..................... 463/25
7,695,366 B1 * 4/2010 Holch ............................. 463/25
7,749,079 B2 * 7/2010 Chamberlain et al. .......... 463/29
7,922,578 B2 * 4/2011 Okuniewicz .................... 463/25
7,963,843 B2 * 6/2011 Martin et al. ................... 463/25
7,988,550 B2 * 8/2011 White ............................. 463/25
8,128,485 B2 * 3/2012 Vlazny et al. ................... 463/25
2004/0204233 A1 * 10/2004 Saffari et al. ................... 463/25
2005/0043086 A1 * 2/2005 Schneider ....................... 463/25
2005/0124408 A1 6/2005 Vlazny et al.
2005/0130735 A1 * 6/2005 Ellis ................................ 463/25
2007/0060274 A1 * 3/2007 Rowe et al. ..................... 463/16
2007/0173322 A1 * 7/2007 Swamy et al. .................. 463/42

* cited by examiner

MANAGING CASHLESS WAGERING GAME SYSTEMS

RELATED PATENT DOCUMENTS

This patent application is a U.S. National Stage Filing under 35 U.S.C. 371 from International Patent Application Serial No. PCT/US2007/013649, filed Jun. 8, 2007, and published on Dec. 21, 2007, as WO 2007/146205 A2, which claims the priority benefit of U.S. Provisional Patent Application Ser. No. 60/804,299 filed Jun. 9, 2006 and entitled "INTEROPERABILITY OF DIFFERENT CASHLESS WAGERING SYSTEMS" and to U.S. Provisional Patent Application Ser. No. 60/829,188 filed Oct. 12, 2006 and entitled "INTEROPERABILITY OF DIFFERENT CASHLESS WAGERING SYSTEMS", the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems, and more particularly, to methods and systems to managing wagering game systems.

BACKGROUND

Wager gaming machines, such as slot machines, video poker machines, and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are most likely attracted to the most entertaining and exciting of the machines. Consequently, shrewd operators strive to employ the most entertaining and exciting machines available because such machines attract frequent play and increase profitability for the operator. In the competitive wager gaming machine industry, there is a continuing need for manufacturers to produce new game types or to enhance entertainment and excitement associated with existing wager gaming machines. One technique used to simplify the gaming experience and provide easier access is cashless wagering.

As casinos progress to a high-technology environment, cashless wagering games have come to the forefront. Cashless wagering systems use a currency substitute, such as a ticket, a player identification card similar to a bank card, a credit card or bank card, a specialized electronic device, token, or other modes. Cashless wagering may have many advantages including reducing or eliminating hopper fills, simplifying handpays, promoting selectable-denomination gaming, and ultimately increasing play time and customer service—resulting in greater profitability for a casino. Cashless wagering generally increases operating efficiencies through reduced labor costs and greater player satisfaction. However, casinos that implement disparate cashless wagering systems may inhibit player enjoyment; thus, it may be desirable to provide a system and method to integrate disparate cashless wagering systems.

DETAILED DESCRIPTION

Example Operating Environment

Figure 1:
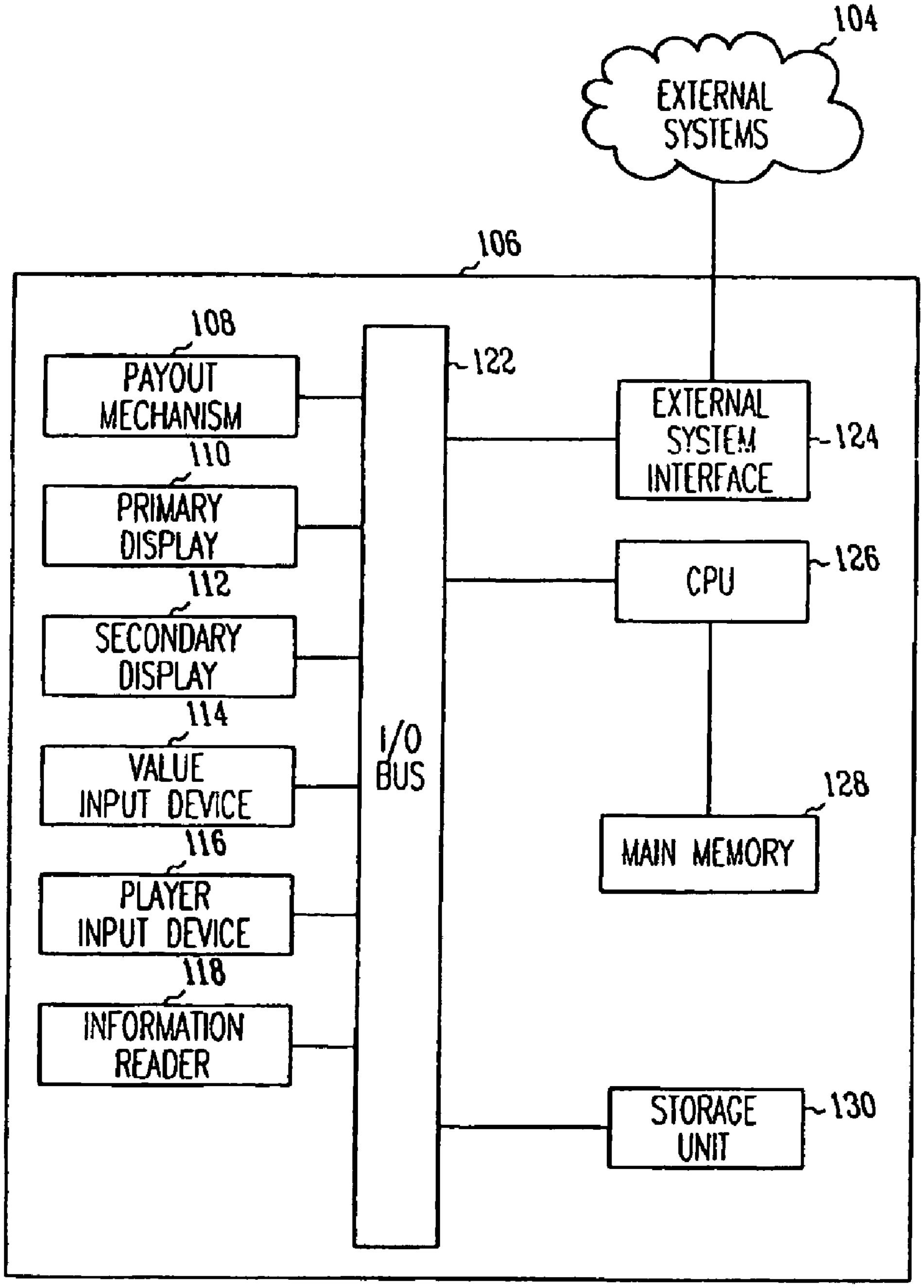
FIG. 1 is a block diagram illustrating a wagering game machine, according to example embodiments of the invention.

FIG. 1 is a block diagram illustrating a wagering game machine, according to example embodiments of the invention. As shown in FIG. 1, the wagering game machine 106 includes a central processing unit (CPU) 126 connected to main memory 128. The CPU 126 is also connected to an input/output (I/O) bus 122, which facilitates communication between the wagering game machine's components. In one embodiment, the CPU 126 can process wagers and conduct wagering games, such as video poker, video black jack, video slots, video lottery, etc., in whole or in part. A logical control module may be constructed using a combination of two or more components as described in FIG. 1. For example, the control module may logically comprise the CPU 126, main memory 128, and storage unit 130, which when used together may control at least some of the operation of the wagering game machine 106. The control module may also be used to enable systems and methods described herein.

The I/O bus 122 is connected to a payout mechanism 108, primary display 110, secondary display 112, value input device 114, player input device 116, information reader 118, and storage unit 130. The player input device 116 may include the value input device 114 to the extent the player input device 116 is used to place wagers. The I/O bus 122 is also connected to an external system interface 124, which is connected to external systems. 104 (e.g., wagering game networks).

In one embodiment, the wagering game machine 106 can include additional peripheral devices and/or more than one of each component shown in FIG. 1. For example, in one embodiment, the wagering game machine 106 can include external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine 106 can include hardware, firmware, and/or software for performing the operations described herein. Furthermore, any of the components can include machine-readable media including instructions for causing a machine to perform the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2:
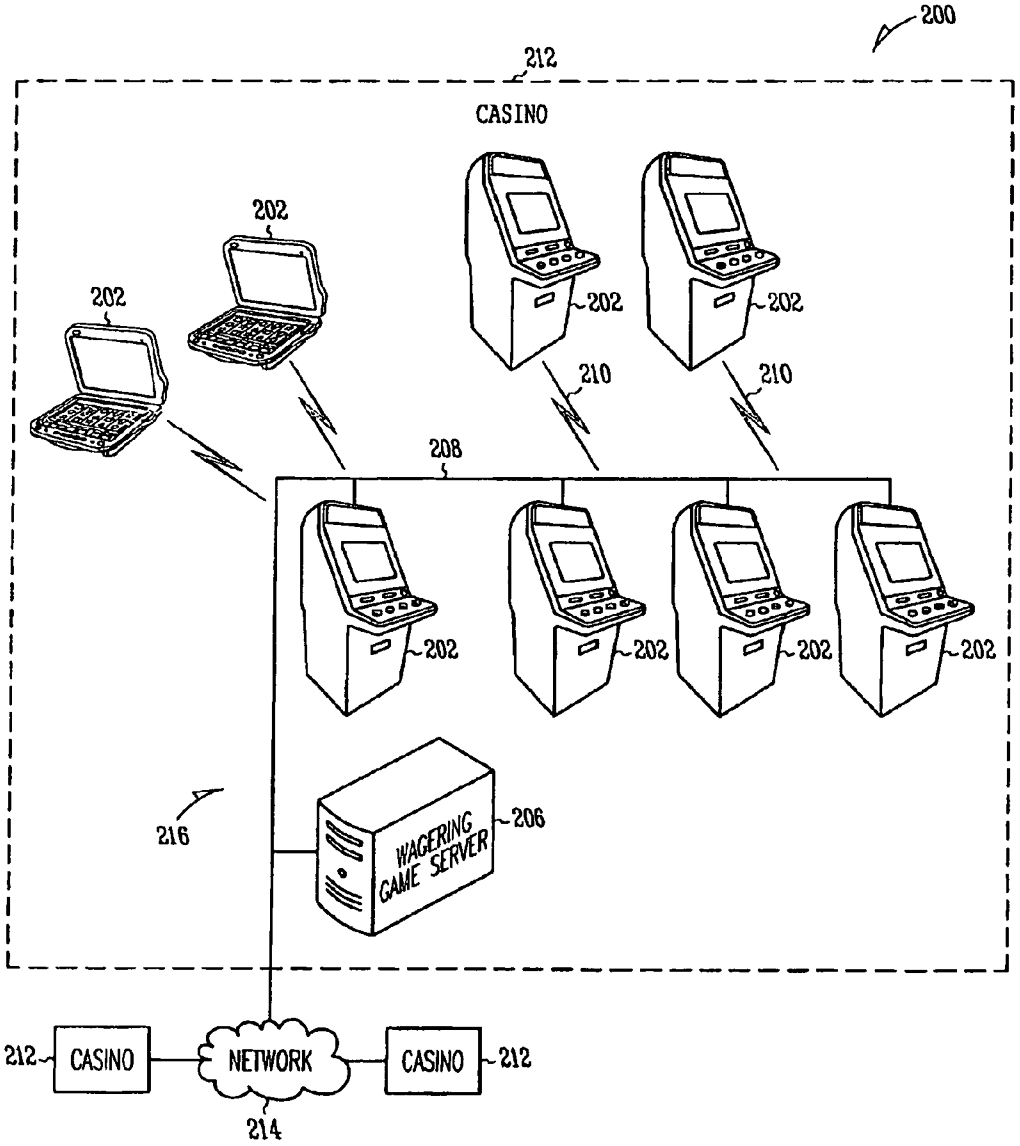
FIG. 2 is a block diagram illustrating a wagering game network, according to example embodiments of the invention.

While FIG. 1 describes example embodiments of a wagering game machine, FIG. 2 shows how a plurality of wagering game machines can be connected in a wagering game network.

FIG. 2 is a block diagram illustrating a wagering game network, according to example embodiments of the invention. As shown in FIG. 2, the wagering game network 200 includes a plurality of casinos 212 connected to a communications network 214.

Each of the plurality of casinos 212 includes a local area network 216 in which wagering game machines 202 are connected to a wagering game server 206 that may serve wagering games over the network 216. The wagering game machines 202 and wagering game server 206 can include hardware and/or machine-readable media including instructions that provide interoperability of different cashless wagering systems, as described herein.

The wagering game machines 202 described herein can take any suitable form, such as floor standing models, handheld mobile units, bartop models, workstation-type console models, etc. Further, the machines 202 may be primarily dedicated for use in conducting wagering games, or may be a non-dedicated device such as a mobile phone, personal digital assistant, personal computer, etc. In one embodiment, the wagering game network 200 can include other network devices, such as accounting servers, wide area progressive servers, player tracking servers, and/or other devices suitable for use in connection with embodiments of the invention.

The components of each casino 212 can communicate over wired 208 and/or wireless connections 210. Furthermore, they can employ any suitable connection technology, such as Bluetooth, 802.11, Ethernet, public switched telephone networks, SONET, etc.

In an embodiment, multiple wagering game servers 206 are available on the network 214. In an embodiment, the game servers 206 communicate with the wagering game machines 202 and mobile wagering game units 204 using a standardized message protocol. For example, the standardized message protocol may be an open standard and may include protocols such as Game-to-System (G2S), Best of Breed (BOB), or SuperSAS. In an embodiment, the protocol supports a multicasting ability.

Example Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware). In some embodiments, the operations are performed in series, while in other embodiments the operations can be performed in parallel. Furthermore, some embodiments perform only a subset of the operations shown in the figures.

As casinos progress to a high-technology environment, cashless wagering has come to the forefront. Cashless wagering systems use a currency substitute, such as a ticket, a player identification card similar to a bank card, a pre-paid card, a credit card, a specialized electronic device, token, or other modes. Cashless wagering may have many advantages including reducing or eliminating hopper fills, simplifying handpays, promoting selectable-denomination gaming, and ultimately increasing play time and customer service—resulting in greater profitability for a casino. Cashless wagering generally increases operating efficiencies through reduced labor costs and greater player satisfaction.

Cashless wagering systems may include ticketing systems, where tickets are printed at cash-out and a player can use the printed ticket as a cash equivalent, for example to convert to cash at a teller, fund an account, or used to credit funds at a wagering game. Ticket systems may also be referred to as ticket-in/ticket-out (TITO) system because the player may insert a ticket to fund a game, play the game, and then receive a ticket during cash out. In some TITO systems, tickets are purchased from a teller and then may be redeemed at a similar teller.

Cashless wagering systems may also include credit card-based gaming. For example, a player may purchase a pre-paid card that has a particular amount of credits or value encoded in it. Pre-paid cards may provide similar advantages to players as ticket-based systems, including portability and security. For example, if a pre-paid card is lost or stolen, then in some systems, a card-holder is protected from loss by deactivating the card.

Cashless wagering systems may also include account-based systems. In one example of such a system, a player account is maintained at a location, such as a centralized server, and the player is issued a player identification card (PIC). The PIC may then be used to activate a game machine, such as by inserting the card into a card reader, and deactivate the game machine, such as by physically removing the card or performing an action to eject the card. Other examples of account-based systems may provide a user interface on "account-enabled" game machines where the player can input their identification and authorization information (e.g., a username and password). After playing the game, the player can "log out" or "cash out", which would terminate the game machine's play mode.

In an account-based system that uses player identification cards (PIC), when a PIC is inserted into the game machine to activate play, the game machine can recognize the amount in the player's account and, in an embodiment, display a credit meter (e.g., an amount of currency or credits) on a display screen in the game machine for the player's reference. In an embodiment, the credit meter is integrated into the PIC, such that a display screen on the PIC may activate and display a credit meter when the PIC is inserted into a game machine to activate play and then deactivate after a certain time (e.g., 30 second delay) when the PIC is removed. In an embodiment, the PIC displays the credit meter in a persistent display. In another embodiment, the player may activate the PIC's display screen, such as by pressing a button on the face of the PIC, to illuminate or display the credit meter. In some embodiments, the PIC is positioned in the game machine such that during play, the credit meter on the PIC card is visible and either mirrors a displayed credit meter on the game machine or acts as a replacement to such a credit meter. In various embodiments, the PIC may display a credit meter during one mode of operation and display the player's account balance during a second mode of operation. In an embodiment, the PIC may display both the credit meter and an account balance.

When a player is finished playing at a game machine, the player can terminate the gaming session. In some embodiments, the player's gaming session terminates upon removal of a PIC. In other embodiments, the player must use an input mechanism, such as an on-screen graphical input, to indicate the player's desire to end the play session, after which the PIC is ejected from the game machine. After the indication is received, the player's account is updated and the play session is terminated, which may also sever the link between the game machine and the computer that stores the player's account.

A casino may offer multiple types of cashless wagering systems. A player that patronizes such a casino may desire to play games that are associated with each of the cashless wagering systems. To accommodate a mixed environment, a system is needed to provide integration (e.g., communication, fund transfer, fund conversion) between disparate cashless wagering systems.

For example, a player may be issued a ticket during cash-out at one game machine in a ticket-based cashless wagering system and may wish to play a different game offered on an account-based cashless wagering system. The alternative situation may also exist where the player has an account with funds in an account-based cashless wagering system and desire to play a game associated with a ticket-based system. Although examples illustrating integration between a ticket-based system and an account-based system are described, systems and methods described herein may provide integration of any two or more cashless wagering systems. For example, integration may be between a ticket-based system and a pre-paid card system, or between a pre-paid card system and an account-based system. As another example, integration may be provided between two similar systems, such as two or more ticket-based systems provided by different vendors.

Figure 3:
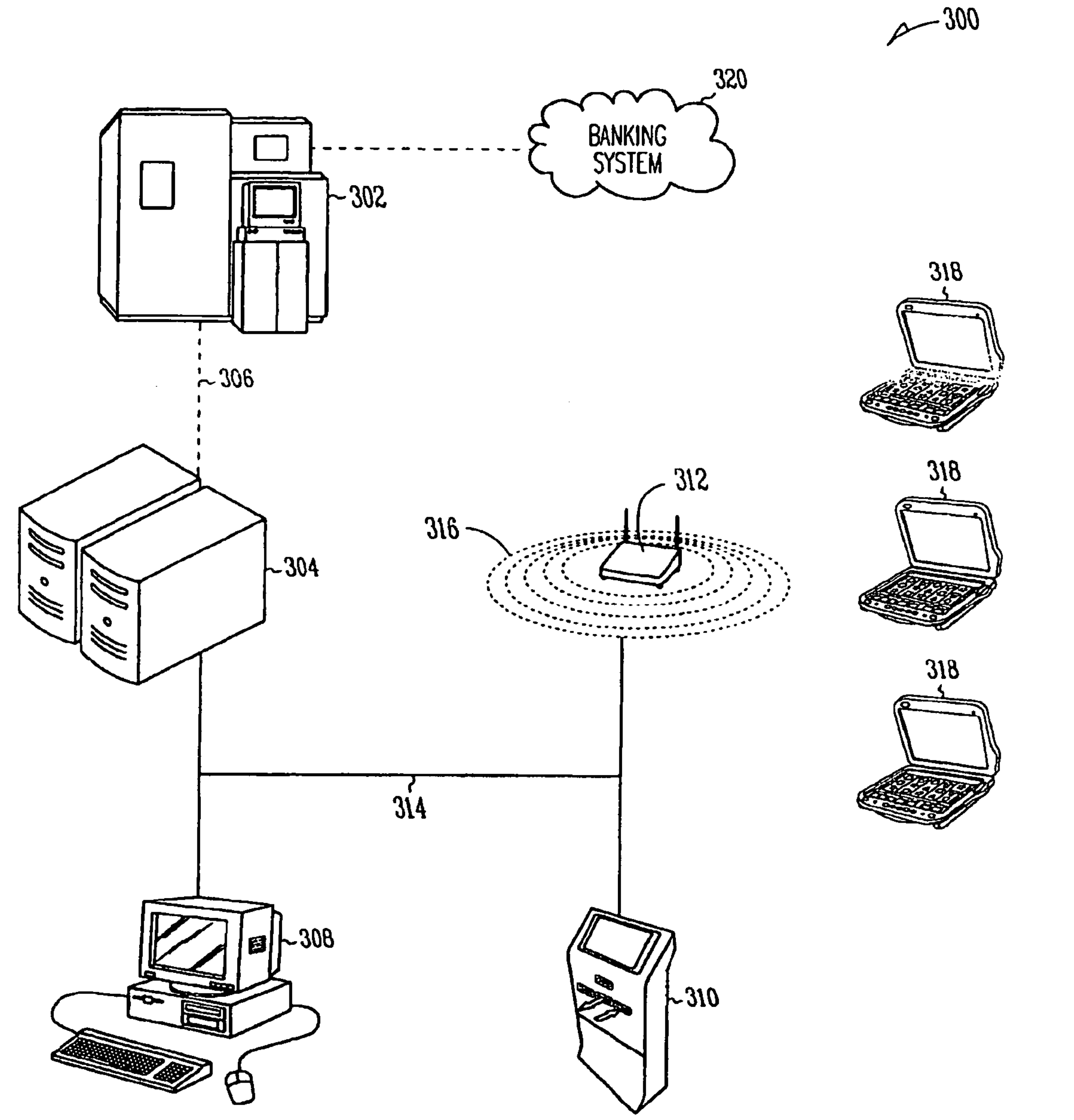
FIG. 3 is a block diagram illustrating portions of a wagering game network, according to example embodiments of the invention.

FIG. 3 is a block diagram illustrating portions of a wagering game network 300, according to example embodiments of the invention. One or more central game controller servers 304 may communicate with one or more casino back-end systems 302 using a communication link 306 to provide for cashless wagering system integration. In an embodiment, the casino back-end system 302 includes a ticket-in/ticket-out (TITO) system, such as EZ Pay by IGT of Reno, Nevada or E-Ticket by Bally Gaming Technologies of Las Vegas, Nevada. Communication link 306 may include casino specific protocols, such as GSA's S2S and SAS.

In an embodiment, the casino back-end systems 302 may communicate with one or more external banking systems 320. Banking systems 320 may include municipal, regional, domestic or international communication networks that enable the transfer and management of financial assets. One example of a banking system 320 includes the U.S. Federal Reserve System.

The central game controller 304 is connected to a network 314, which may include wired or wireless communication technologies such as Ethernet. The central game controller 304 additionally can communicate over one or more direct or networked connections to an attendant workstation 308 and a cashless wagering kiosk 310. In addition, one or more portable gaming terminals 318 (e.g., wagering game machine 202 in FIG. 2) may communicate wirelessly with the network 314 via an access point 312 using a wireless network 316.

In an embodiment, the cashless wagering kiosk 310 acts as a stand-alone cashless wagering system gateway device to provide financial integration between two or more cashless wagering systems. For example, a player may use the cashless wagering kiosk 310 to transfer funds from one cashless wagering system to another (e.g., from an account-based system to a TITO system or from a TITO system to a pre-paid card system).

In another embodiment, the cashless wagering kiosk 310 is associated with a particular cashless wagering system and provides access to wagering games of the cashless wagering system to players who use other cashless wagering systems. In such an embodiment, players wishing to play a particular game on a particular cashless wagering system may fund the game by using the cashless wagering kiosk 310. Players may use currency or other cashless wagering system funds to obtain credits for (fund) the particular game.

In another embodiment, the cashless wagering kiosk 310 is configured to communicate with one or more banking systems 320 using the network 314 and casino back-end systems 302 to provide a player with access to one or more bank accounts. The player may use the cashless wagering kiosk 310 to withdraw funds, fund or credit a currency substitute (e.g., a pre-paid card), or deposit funds using currency or a currency substitute, in various embodiments.

Figure 4:
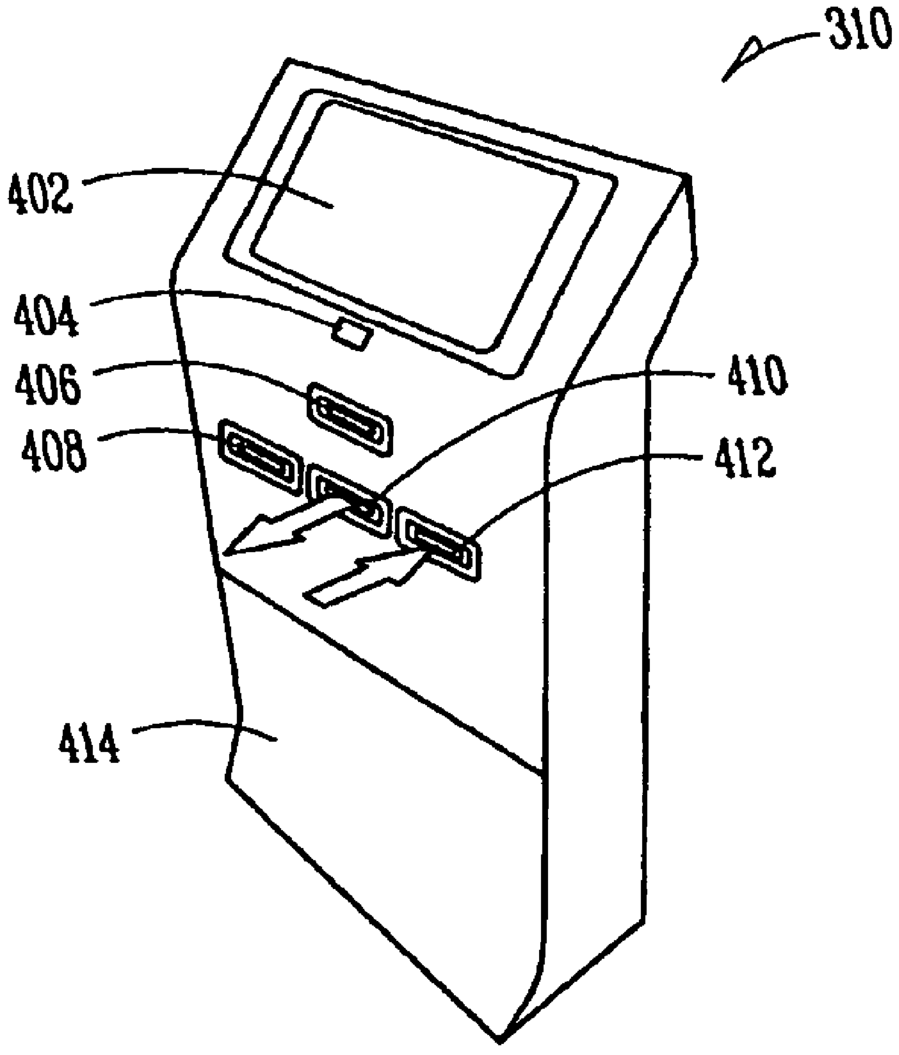
FIG. 4 is a perspective view of a cashless wagering kiosk, according to example embodiments of the invention.

FIG. 4 is a perspective view of a cashless wagering kiosk 310, according to example embodiments of the invention. The cashless wagering kiosk 310 includes a housing 414. The housing 414 may include one or more input devices. Input devices may include a biometric reader 404, a player identification reader 406, a bill acceptor 412, and a primary display 402. In an embodiment, the primary display 402 has touch screen capability. In addition, the cashless wagering kiosk 400 includes one or more output devices. The primary display 402 acts as visual output device to provide a user interface to manage player information or financial transactions. In embodiments, output devices include a ticket printer 410 or a player identification dispenser 408. While some components of the cashless wagering kiosk 310 are described herein, other devices or elements can exist and can be used in any number or combination to create varying forms of the cashless wagering kiosk 310.

For example, in an embodiment, the cashless wagering kiosk 310 operates in part as a gaming machine. The cashless wagering kiosk 310 may include a similar platform as a wagering game machine (e.g., wagering game machine 1500 at FIG. 15) and be capable of providing game play experiences, such as scratch cards or spins, that use a random number generator or other gaming software. Such games may be integrated into promotions or other attractions to entice players to use the cashless wagering kiosk 310 and play a wagering game in an alternative cashless wagering system. The cashless wagering kiosk may provide a side game/bonus/entertainment that may provide "promotional credits" to the patron when using a gaming network. For example, in one example embodiment, when a patron uses the cashless wagering kiosk 310 to deposit funds into their account, a side game may appear and, with or without player input and with or without a wager, the kiosk may award zero to some positive value of promotional credits to the patron's account. In a further embodiment, a positive history of the patron may be used as input to improve outcome possibilities of the side game. The outcome of the side game may be determined by a random number generator (RNG) residing in the cashless wagering kiosk 310 or a remote server (e.g., central game controller 304). In various embodiments, the cashless wagering kiosk 310 may be a thin, thick, or rich client, similar to wagering game machine 1500, in the context of game play. In a further embodiment, the cashless wagering kiosk 310 may include a prize dispenser (not shown) to dispense a ticket, pre-paid card, or other prize tendered to the user after completion of a game or other promotional event.

In one example embodiment, a player is presented with a graphical user interface, such as on a primary display 402 of a cashless wagering kiosk 310, which the player may use to control the kiosk 310. In an embodiment, the primary display 402 is touch-sensitive and can receive player input in response to prompts and graphical controls presented to the player on the primary display 402. In other example embodiments, input modes, such as buttons on the housing 414 of the cashless wagering kiosk 310, may be used by a player to interact with the kiosk 310.

In some embodiments, the cashless wagering kiosk 310 is programmed or otherwise enabled to accommodate for one or more casino operation procedures, such as value limits on currency substitutes that are dispensed, authorized or issued by the cashless wagering kiosk 310. For example, to conform to a casino policy or procedure, a cashless wagering kiosk 310 may be programmed with a maximum amount that can be printed on a ticket to be dispensed to a customer. Other examples include maximum or minimum values to restrict or limit hopper limits (e.g., the number of tokens dispensed), pre-paid card authorization or dispensed limits, or limits on the amount to be transferred, deposited, or dispensed as currency.

Figure 5:
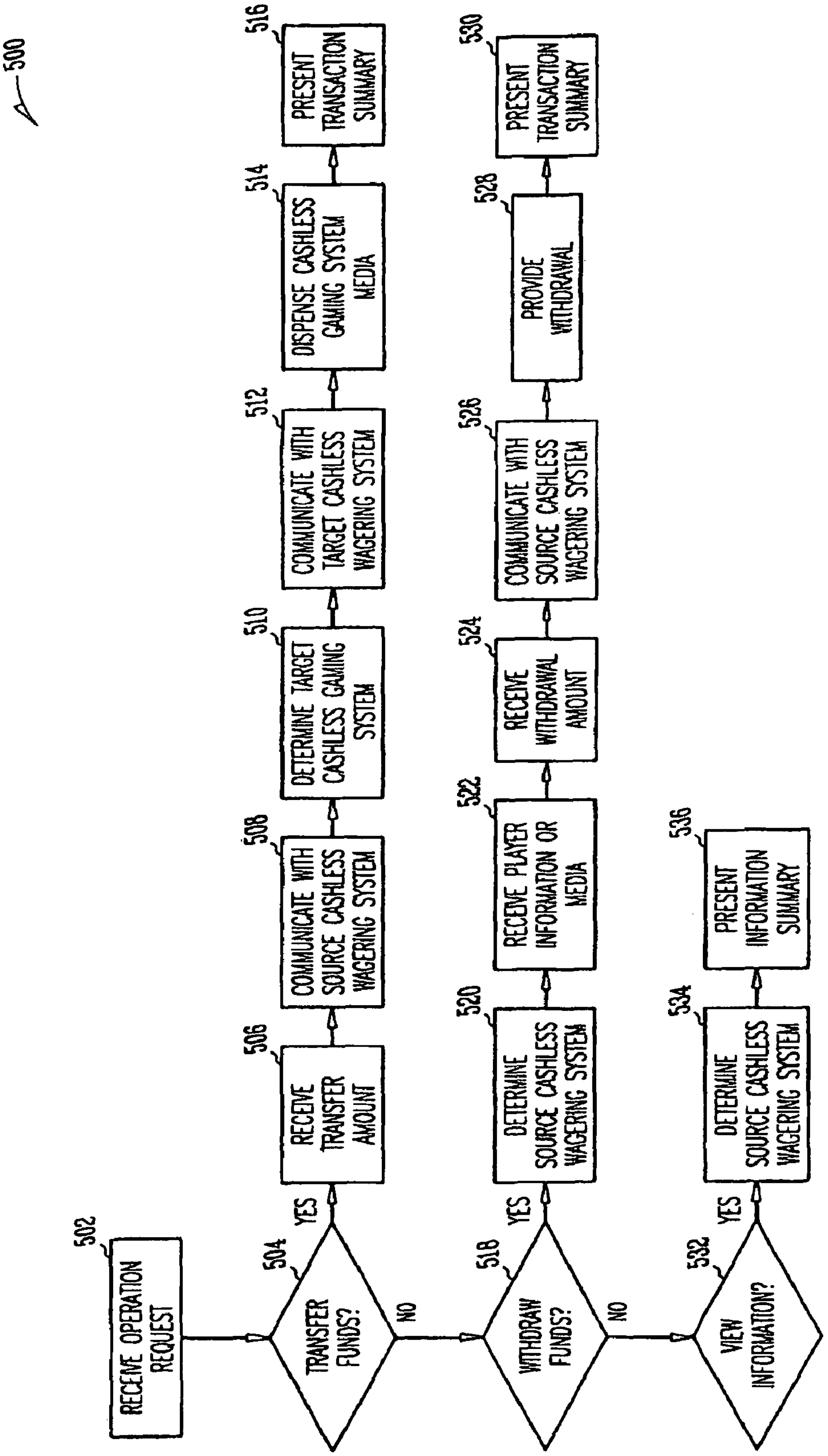
FIG. 5 is a flowchart illustrating a method of managing funds using a cashless wagering kiosk, according to example embodiments of the invention.
Figure 6:
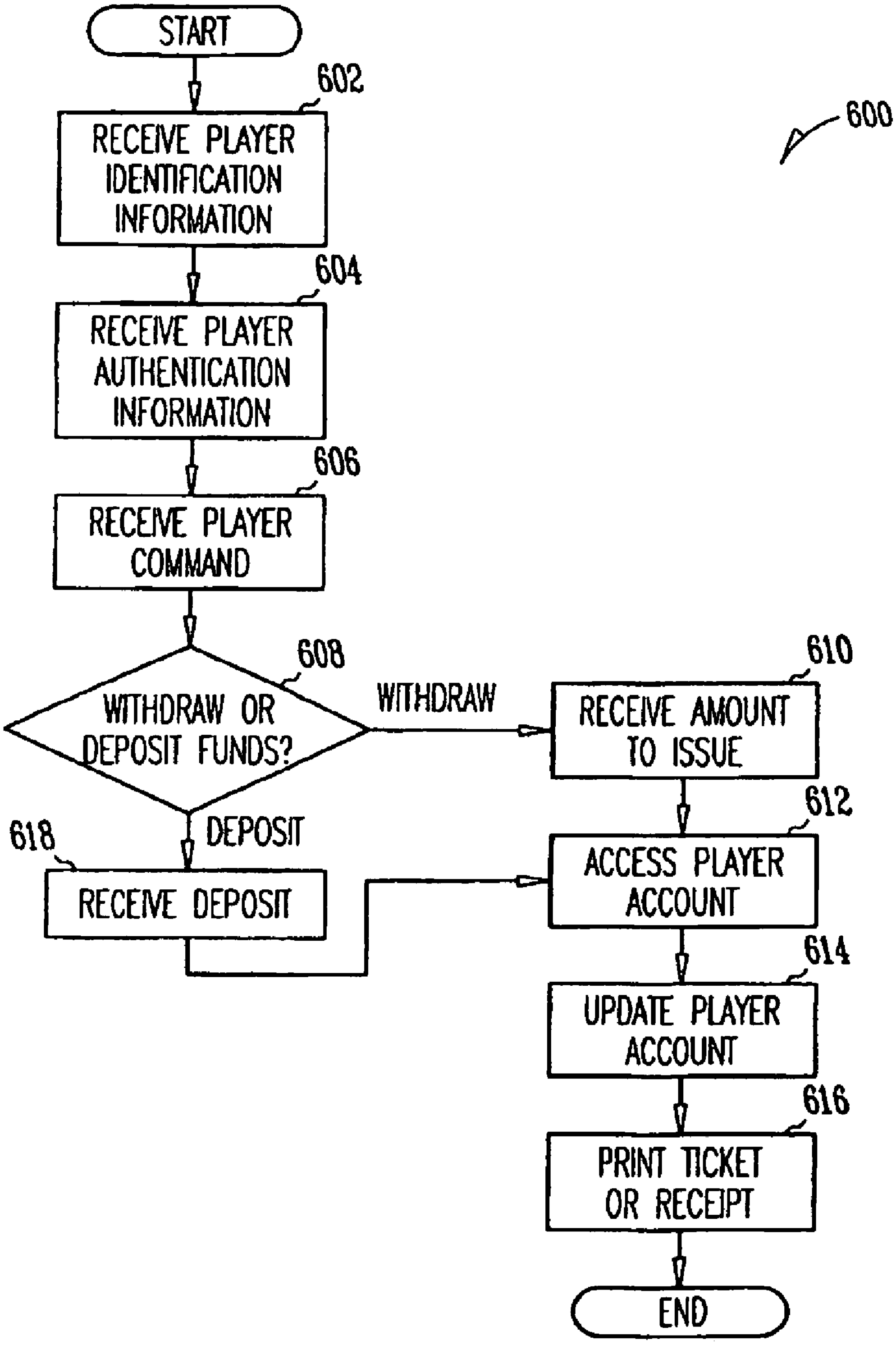
FIG. 6 is a flowchart illustrating a method of converting funds from a first cashless wagering system to a second cashless wagering system, according to example embodiments of the invention.

FIGS. 5 and 6 illustrate various methods for using a cashless wagering kiosk 310 as a cashless wagering system gateway device. FIG. 5 is a flowchart illustrating a method 500 of managing funds using a cashless wagering kiosk 310, according to example embodiments of the invention. FIG. 6 is a flowchart illustrating a method 600 of converting funds from a first cashless wagering system to a second cashless wagering system, according to example embodiments of the invention.

Referring first to FIG. 5, at 502, an operation request is received. In an embodiment, the operation request is a result of the player's interaction with an on-screen menu, for example provided by the primary display 402. In another embodiment, the operation request is a result of a player's physical manipulation of controls on the housing 414 of the cashless wagering kiosk 310. Controls may include such things as buttons, switches, or the like. For example, a button may be labeled "Transfer Funds" and depressing the button may activate a graphical user interface on the primary display 402 to assist in the transaction of transferring funds to a player's wagering game account.

At 504, the operation request is evaluated to determine if the player desires to transfer funds between cashless wagering systems. If so, then at 506, a transfer amount from the player is received. In various embodiments, the transfer amount may include currency or a currency substitute (e.g., a ticket associated with a ticket-based cashless wagering system or a pre-paid card associated with a different cashless wagering system), either alone or in combination. For example, the player may insert currency bills or tickets into the bill acceptor 412. As another example, a player wishing to transfer funds currently associated with a pre-paid card, may swipe the card through a card reader input device (not shown). In an alternative example, the card is fully inserted into the card reader input device for processing.

At 508, if the transfer amount is from a cashless wagering system, then data is communicated to an associated cashless wagering system for reconciliation and tracking. For example, if a player wishes to transfer funds using a pre-paid card, the amount of the transfer is communicated to the cashless wagering system that manages the pre-paid card. The pre-paid card cashless wagering system may update its records to indicate the reduction of the amount associated with the pre-paid card. If there are insufficient funds to fund the deposit or other issues, such as a hold on the card, then the cashless wagering system may return an error. If there is an error, the player may be notified, such as via the primary display 402, and may be presented with an initial menu selection screen or may request an alternative deposit.

At 510, a target cashless wagering system is determined. Target cashless wagering systems may include a TITO system, an account-based system, or another pre-paid card system in various embodiments. The player may be presented with an option screen to choose the destination of the transfer, after which an appropriate input request is made. For example, if the player chose an account-based system as the transfer's destination, then an account log on screen is provided on the primary display 402. The player may instead be instructed to swipe or insert their player identification card, which would provide account access for deposits. The player may provide a password or other authentication to access the account for deposits in various embodiments. As another example, if the player chose a TITO system as the transfer's destination, then there may be no need for player identification or authentication, and the method would proceed to block 512.

At 512, the transfer amount is credited to the target cashless wagering system. In an embodiment, the transfer amount is communicated over the network to back-end systems 302 using the communication link 306. The back-end systems 302 may then record and reconcile the deposit amount.

At 514, depending on the target cashless wagering system, a cashless wagering system media is dispensed. For example, if the target cashless wagering system is a TITO system, then once the TITO system records the credited deposit amount (block 512), the cashless wagering kiosk 310 can dispense a ticket with the appropriate amount encoded. Similarly, if the target cashless wagering system is a pre-paid card system, then either an existing card that the player was previously using is dispensed with an associated updated amount or a new card is dispensed. In the case of an account-based system, no cashless wagering system media is dispensed, but the player's identification card may be returned at this point.

At 516, a transaction summary may be presented to the player. In an embodiment, the player is presented with a detailed transaction summary and the option to obtain a printed receipt. The printed receipt may contain the same, more or less information as the detailed visual summary.

At 518, the operation request is evaluated to determine if the player desires to withdraw funds from a cashless wagering system. If so, then at 520, a source cashless wagering system is determined. In an embodiment, an option menu is presented to the player, such as on the primary display screen 402, which contains the various cashless wagering systems that the cashless wagering kiosk 310 supports as sources for withdrawal. For example, if a cashless wagering kiosk 310 provides fund transfer (e.g., deposits) between a TITO system and an account-based system, then the presented option menu may include two choices, one representing each system.

At 522, either the player's information or the player's cashless wagering system media is received, depending on the source cashless wagering system indicated at block 520. For example, if the player desires to withdraw an amount from an account-based system, then the player's identification may be authenticated. In an embodiment, the player may provide identification by inserting or swiping a player identification card (PIC). The player may then be presented with a password or access code prompt, where the player can provide an authentication code (e.g., personal identification number (PIN) or password). As another example, if the player desires to withdraw an amount from a TITO system or a pre-paid card system, then the ticket or the card is provided to the cashless wagering kiosk 310 by the player. The ticket may be inserted into bill acceptor 412 to be read and processed. A pre-paid card may be swiped or inserted, depending on the type of card reader input device (not shown) implemented on the cashless wagering kiosk 310.

At 524, a withdrawal amount from the player is received. In an embodiment, a player may be limited by one or more constraints. For example, in some embodiments, a player may not withdraw a larger amount than the player's current balance in the player's account. In other embodiments, the player is given choices of multiple of amounts (e.g., $20, $40, $60) to withdraw. In an embodiment, the player may have to withdraw a minimum amount or be restricted to withdrawing a maximum amount, such as a maximum of $500 per day.

At 526, the withdrawal is debited from the source cashless wagering system. For example, if the player is withdrawing from an account-based system, the player's account is updated to reflect the amount withdrawn.

At 528, the withdrawal amount is provided to the player. In an embodiment, the player may be able to obtain some or all of the withdrawal as cash or a cash equivalent (e.g., cashier's check, money order, or house voucher).

At 530, a transaction summary may be presented to the player and a printed receipt may be generated and provided.

At 532, the operation request is evaluated to determine if the player desires to view information related to a cashless wagering system. If so, then at 534, a source cashless wagering system is determined. In an embodiment, an option menu is presented to the player, such as on the primary display screen 402, which contains the various cashless wagering systems that the cashless wagering kiosk 310 supports as sources for withdrawal. For example, if a cashless wagering kiosk 310 provides fund transfer (e.g., deposits) between a TITO system and an account-based system, then the presented option menu may include two choices, one representing each system. In an embodiment, the player is instructed to perform an action, from which a source cashless wagering system can be determined. For example, the player is provided a general instruction to "Insert their player identification card into the player identification reader, insert a ticket into the bill acceptor, or swipe a pre-paid card through the card reader." Upon detecting input from one of these sources, the cashless wagering kiosk 310 can verify the media provided by the player for authenticity and appropriateness and provide information using the input. In an embodiment, if the player inserts a player identification card to access an account, then the player may be presented with a prompt asking for a password or access code to authenticate the player's identity.

At 536, a summary related to the source cashless wagering system may be presented to the player. For example, if the player swipes a pre-paid card, then one or more details about the card's use may be presented, such as the current balance, one or more historical transactions, one or more pending transactions, or other status information. In an embodiment, the player may be provided the option to print a receipt of the transaction showing some or all of the information displayed.

FIG. 6 is a flowchart illustrating a method 600 of converting funds from a first cashless wagering system to a second cashless wagering system. At 602, player identification is received. In an embodiment, a player may use an identification card, such as a media that utilizes a magnetic strip or an RFID tag, to communicate identification information to a cashless wagering kiosk 310.

At 604, player authentication information is received. In an embodiment, the player may input a code, such as a personal identification number (PIN) or password, using the touch screen display 402 to authenticate the player's identity. In another embodiment, the player may implement the biometric reader 404 to present biometric identification information, such as the player's fingerprint, retinal scan, facial recognition, voice recognition, or other uniquely identifying feature to authenticate the player's identity.

At 606, after the player is identified and authenticated, a command is received. For example, one or more actions may be indicated on the display screen 402, such as "View Account," "Withdraw Funds," "Deposit Funds," or "Exit." In an embodiment, a player may issue a command to the cashless wagering kiosk by touching the appropriate area on the display screen 402. In another embodiment, each action may be associated with indicia, such as a numeral, by which the player may select a desired action by pressing a corresponding key on a keypad or other input device.

At 608, the player's command is received and determined whether the command is to withdraw or deposit funds. In other embodiments, additional commands and associated responsive actions that relate to the user interface and to managing a player's account are considered to be within the scope of this invention.

At 610, if the command is to withdraw funds, then the amount to issue is received. In an embodiment, a player may be limited by one or more constraints. For example, in some embodiments, a player may not withdraw a larger amount than the player's current balance in the player's account. In other embodiments, the player is given choices of multiple of amounts (e.g., $20, $40, $60) to withdraw. In an embodiment, the player may have to withdraw a minimum amount or be restricted to withdrawing a maximum amount.

At 612, the player's account is accessed to withdraw the funds. In an embodiment, if the player is withdrawing funds in the form of a ticket, an account-based system may communicate the amount to be withdrawn to a TITO system. The TITO system may then update its records to show the additional funds operable within its system. The account-based system can then debit the player's account, to reflect the withdrawal from the player's account.

At 614, the player's account is updated to reflect the amount withdrawn. In an embodiment, at 616, the player is issued a currency substitute, such as a ticket, where the ticket may contain a code indicating an amount substantially equal to the amount the player withdrew from the player account. Currency substitutes may include in some embodiments tickets, electronic tickets (e.g., an RFID tag), tokens, passbooks, or the like. In various embodiments, the amount coded on the currency substitute (e.g., ticket) may not be the same as the amount withdrawn. For example, as a reflection of transaction costs (e.g., a surcharge), currency exchange rates, or other fees the amount coded on the currency substitute may be less than the amount withdrawn. In other embodiments, the amount coded on the currency substitute may be more than the amount withdrawn, such as during a promotional period or as a result of a side game or promotional event. In an embodiment, the player may be able to obtain some or all of the withdrawal as cash or a cash equivalent (e.g., cashier's check, money order).

At 618, if the player's command indicated that the player desired to deposit funds into the player account, then one or more deposits are received. In an embodiment, a deposit may be in the form of a ticket, such as one used in a TITO cashless wagering system. In an embodiment, the deposit may be cash, coin, or other currency. In the case where the player deposits a ticket used in a TITO system, the amount deposited is communicated to the TITO system for reconciliation and fund tracking.

After receiving the deposit or deposits, the player's account is accessed 612 and updated 614. In an embodiment, the amount credited to the player's account may not be the same as the amount deposited. For example, in a promotional period or as a result of a side game, promotional event, or the like, a player may receive an additional amount credited to the corresponding player account. As another example, the amount credited to the player's account may be less than the amount deposited, such as to reflect transaction costs (e.g., a surcharge, currency exchange rate, or other use fee). At 616, a receipt is printed and delivered to the player.

Figure 7:
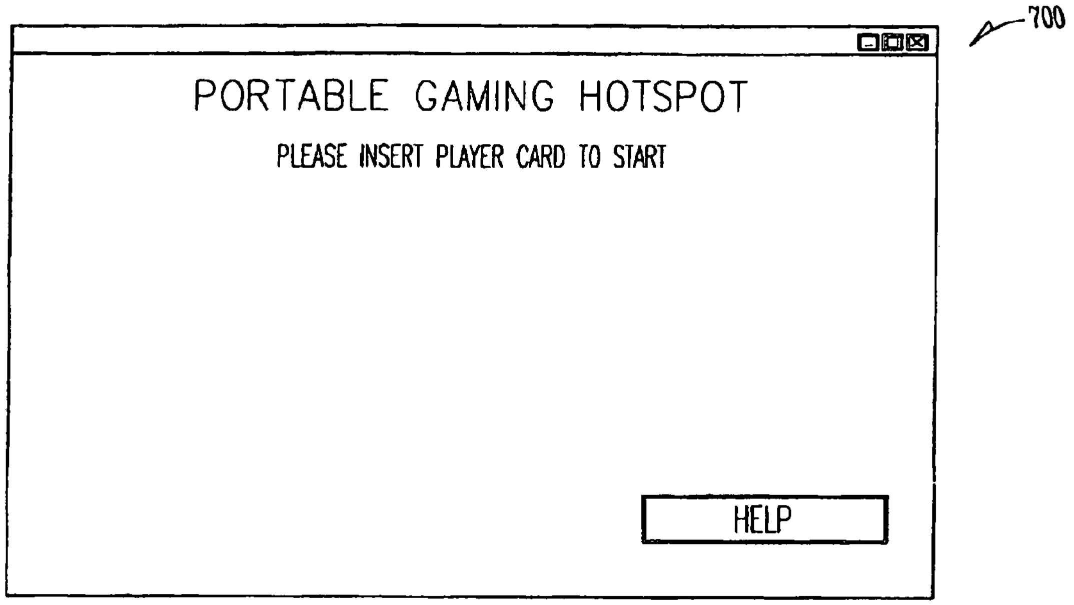
FIGS. 7-14 are display screens according to example embodiments of the invention.

FIGS. 7-14 are display screens according to example embodiments of the invention. FIG. 7 is an attract screen 700 that may be displayed on a cashless wagering kiosk 310 in accordance with an example embodiment. An attract screen 700 is typically presented while the cashless wagering kiosk 310 is in idle mode. In an embodiment, the attract screen 700 includes instructions to a player to insert their player identification card (PIC) to begin one or more kiosk operations.

Figure 8:
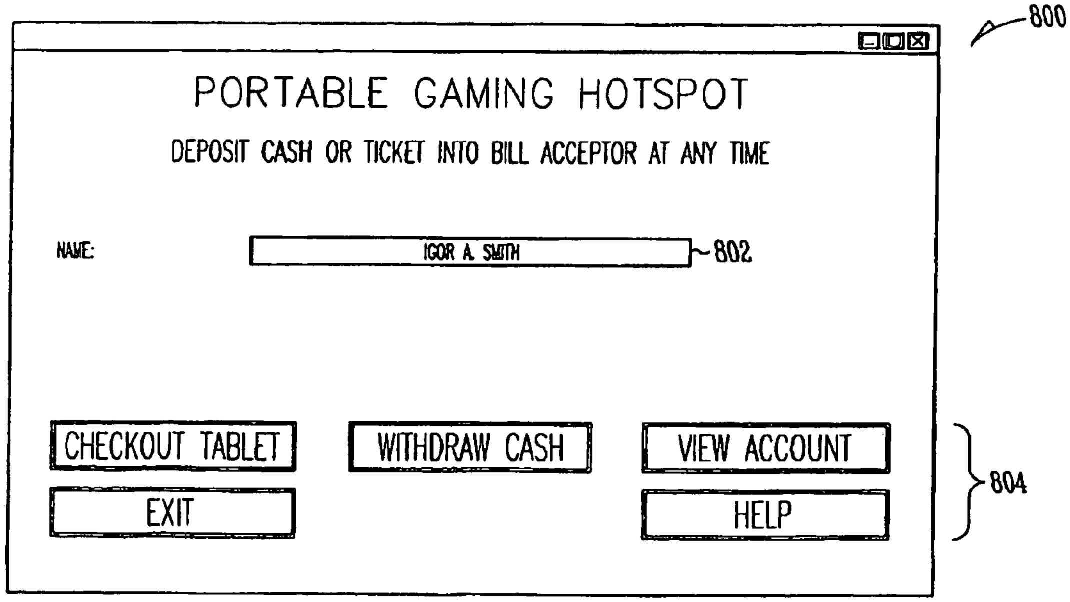
Figure 9:
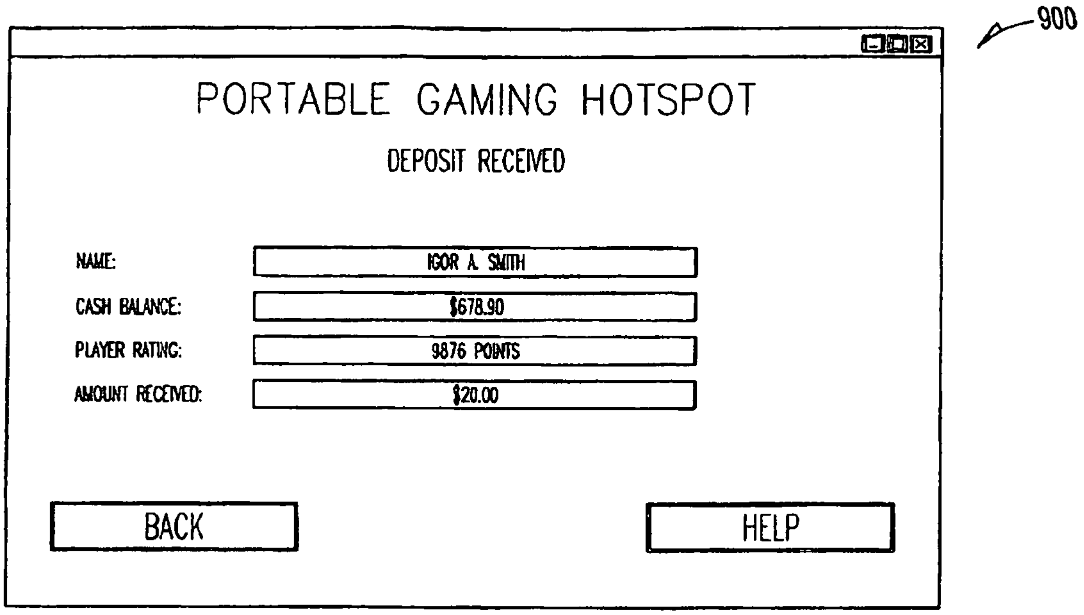
Figure 10:
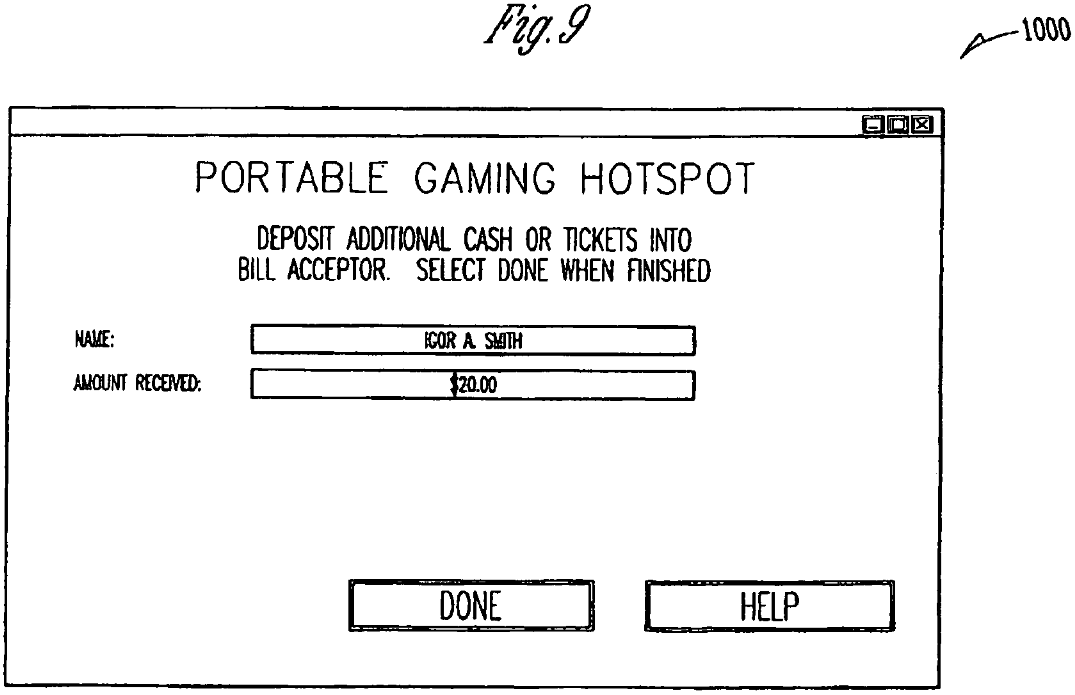

FIG. 8 is a main menu 800 presenting the player with one or more command options in accordance with an example embodiment. When a player inserts their PIC, the main menu 800 is presented. The main menu 800 may include the player's name (or nickname) 802 and a menu of player options 804. In some embodiments, the main menu 800 and other screens that are presented to the player during operation of the cashless wagering kiosk 310 include a "Back" or "Exit" graphical control, such as in the lower left corner of the display, or a "Help" or a "Call Attendant" graphical control, such as in the lower right corner of the display. In various embodiments, some or all of the controls may not be active or enabled for a particular player. For example, if the player has a low balance in their account, the "Withdraw Funds" option may not be enabled. As another example, a player may be restricted from checking out a portable gaming machine, such as a portable gaming tablet (PGT), and so the "Checkout Tablet" option may be disabled. In an embodiment, the cashless wagering system may enforce a maximum number of PGT's that may be used at one time by a player account. If the player account is already at the maximum, then the "Checkout Tablet" option may not be enabled on the main menu 800. As another example, if the cashless wagering kiosk 310 is not equipped to dispense PGT's or if the kiosk 310 does not have any PGT's available to dispense, then the "Checkout Tablet" option may be disabled.

In an embodiment, adding funds to an account does not involve a distinct menu selection. Instead, as the instructions on the main menu 800 indicate, the player may simply deposit cash or tickets in the bill acceptor 412. Upon receiving cash or tickets via the bill acceptor 412, the cashless wagering kiosk 310 may provide a summary screen 900, such as the one illustrated in FIG. 9. In an embodiment, the player may be presented with an intermediate deposit screen 1000, such as the one illustrated in FIG. 10, which allows the player to repeatedly insert cash or tickets until the entire deposit is received. When the player is finished inserting the deposit, then the summary screen 900 may be presented with the aggregated deposit shown.

Figure 11:
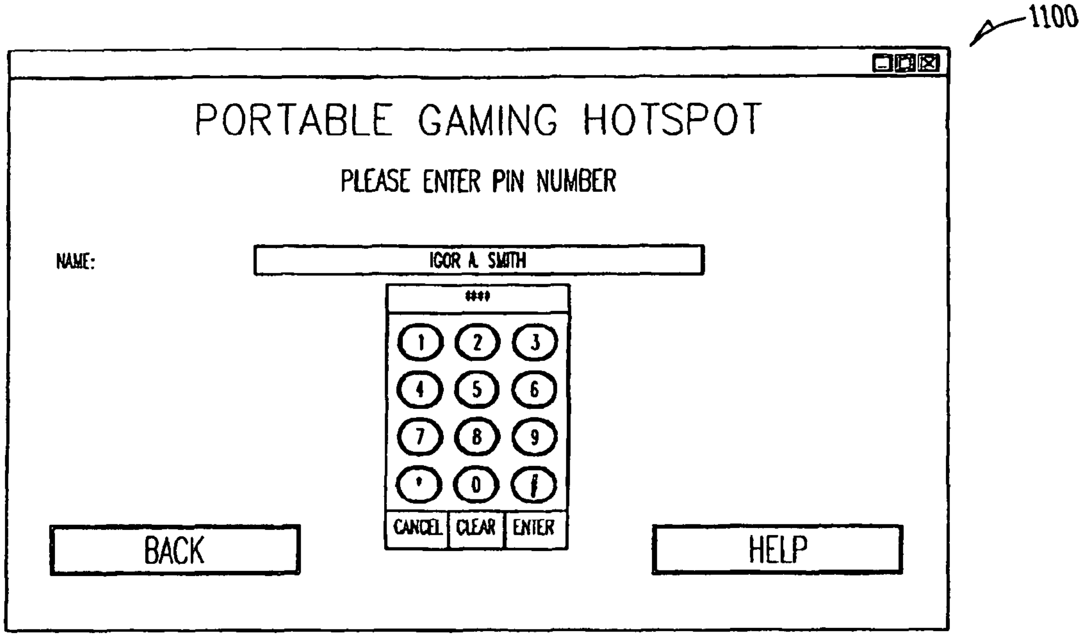

When a player wants to play a wagering game using the funds in their player account, they may check out a PGT. In an embodiment, the player may provide a player authentication to obtain a PGT. FIG. 11 is a player authentication screen 1100, which may be presented after the player chooses "Checkout Tablet" from the main menu 800 (FIG. 8), in accordance with an example embodiment. The player authentication may be a personal identification number (PIN), as depicted in FIG. 11, or in other embodiments, the player authentication may include biometric information, such as a fingerprint scan. After successfully entering the player authentication information, the cashless wagering kiosk 310 presents a checkout screen.

Figure 12:
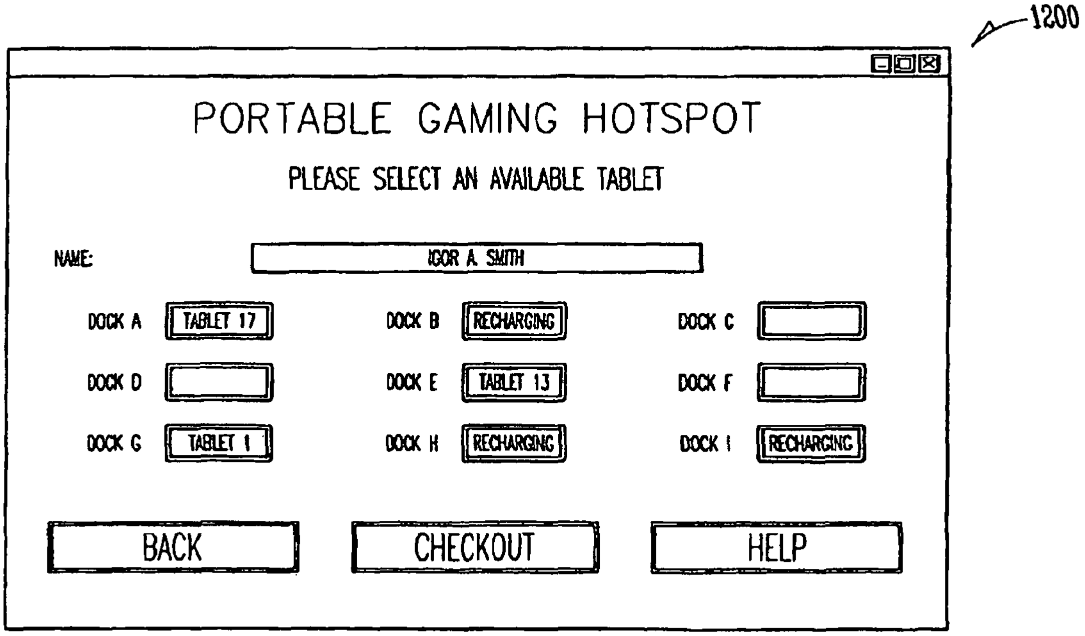

FIG. 12 is a checkout screen 1200 that allows a user to obtain a PGT in accordance with an example embodiment. In an embodiment, the cashless wagering kiosk 310 is coupled to a PGT dispenser. The PGT dispenser may include one or more docking stations to recharge and secure the PGT's between uses. Each PGT's status may be indicated on the checkout screen 1200. The status may include a vacant status, a recharging status, or an available status. The player may choose an available PGT, such as by activating a graphical button to highlight the desired PGT and then activating the "Checkout" graphical control. In the example illustrated in FIG. 12, the player has highlighted "Tablet 13" to checkout for play. After finishing game play on the PGT, the player may return the PGT to an attendant to re-dock the PGT in the PGT dispenser. Alternatively, the player may re-dock the PGT using one or more display screens on the cashless wagering kiosk 310 to control the PGT dispenser's operation.

Figure 13A:
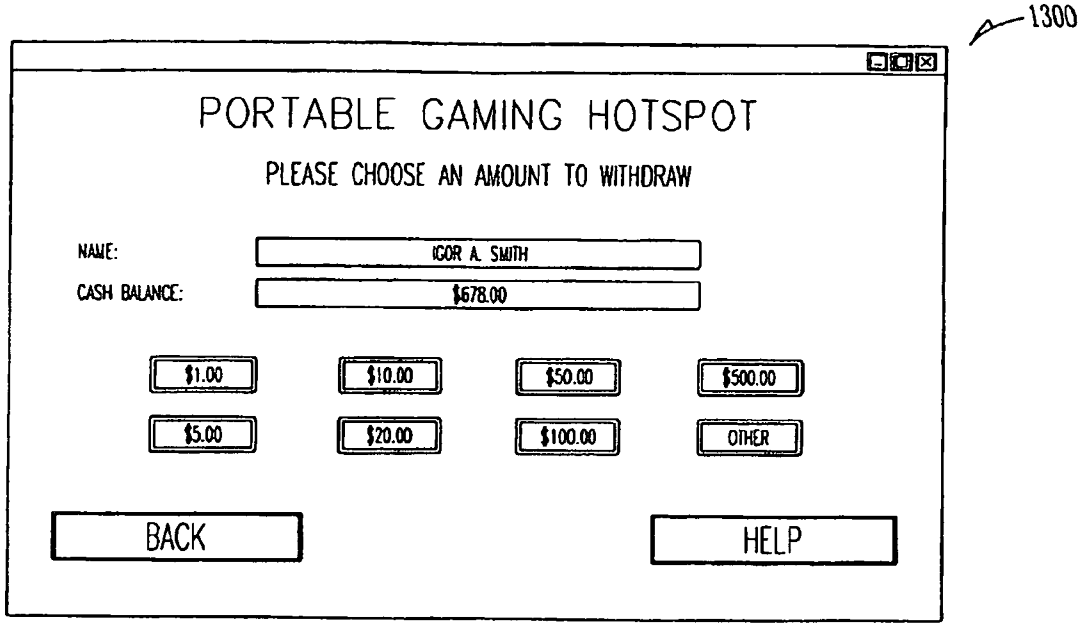
Figure 13B:
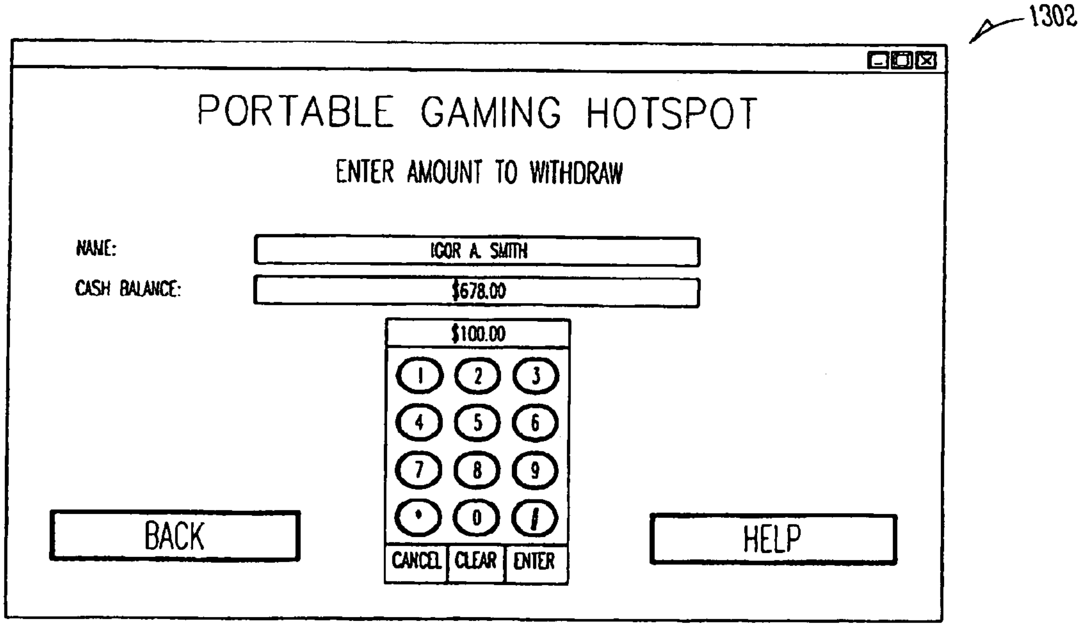

At some point, a player may wish to withdraw funds from their player account. This may occur, for example, after a player has completed game play on a PGT. FIG. 13A is a withdrawal screen 1300 in accordance with an example embodiment. In an embodiment, the player may provide their authentication information, such as by using a screen similar to the player authentication screen in FIG. 11. After the player is authenticated, the withdrawal screen 1300 presents the player's identity and current account balance along with one or more fixed dollar amounts to withdraw. In an embodiment, the player is also presented with a non-fixed dollar withdrawal method, such as with the "$ Other" button. FIG. 13B is a withdrawal screen 1302 that allows a player to withdraw a non-predetermined amount in accordance with an example embodiment. In an embodiment, the non-predetermined withdrawal screen 1302 is presented after the player chooses the "$ Other" button from the general withdrawal screen 1300. In an alternative embodiment, the non-predetermined withdrawal screen 1302 is the default screen presented to the player after receiving a command to withdraw funds from a player's account. After the player indicates a withdrawal amount, then the cashless wagering kiosk may verify that the player's account can cover the requested funds, issue a withdrawal in the form of currency or a currency substitute, and dispense a printed receipt for the player's records.

Figure 14:
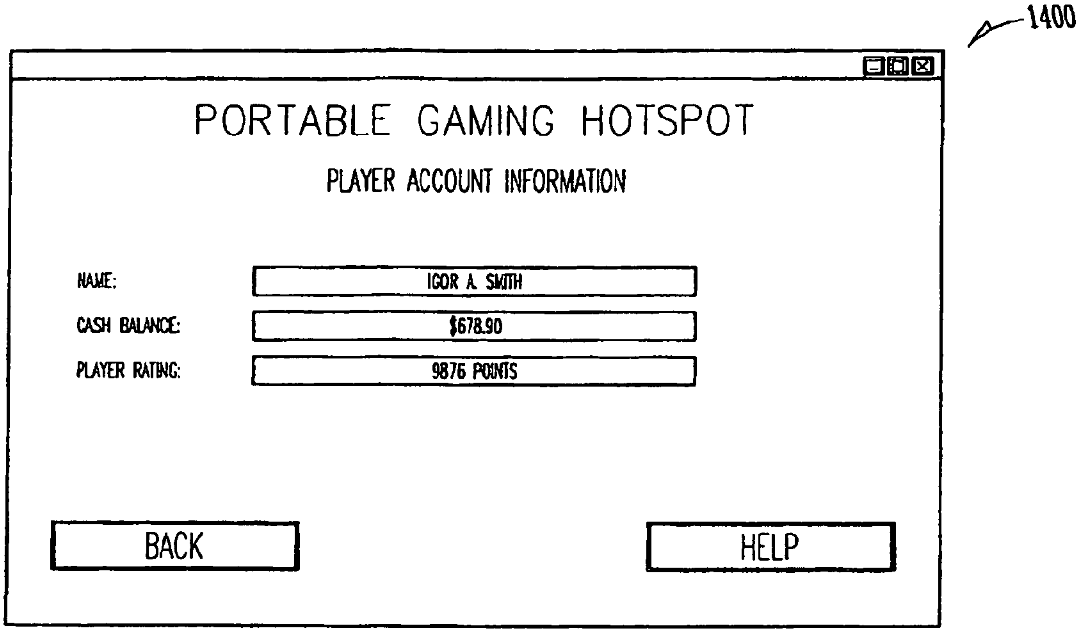

The player may also wish to view their account details. In an embodiment, to access account information, the player may provide their authentication information, such as by using a screen similar to the player authentication screen in FIG. 11. FIG. 14 is a player account information screen 1400 in accordance with an example embodiment. After authenticating the player, the player's account information screen 1400 is presented. In an embodiment, the player is shown their current account balance and their player rating. The player rating may be an indication of loyalty or use and may be used by a casino to reward regular players.

Example Wagering Game Machines

Figure 15:
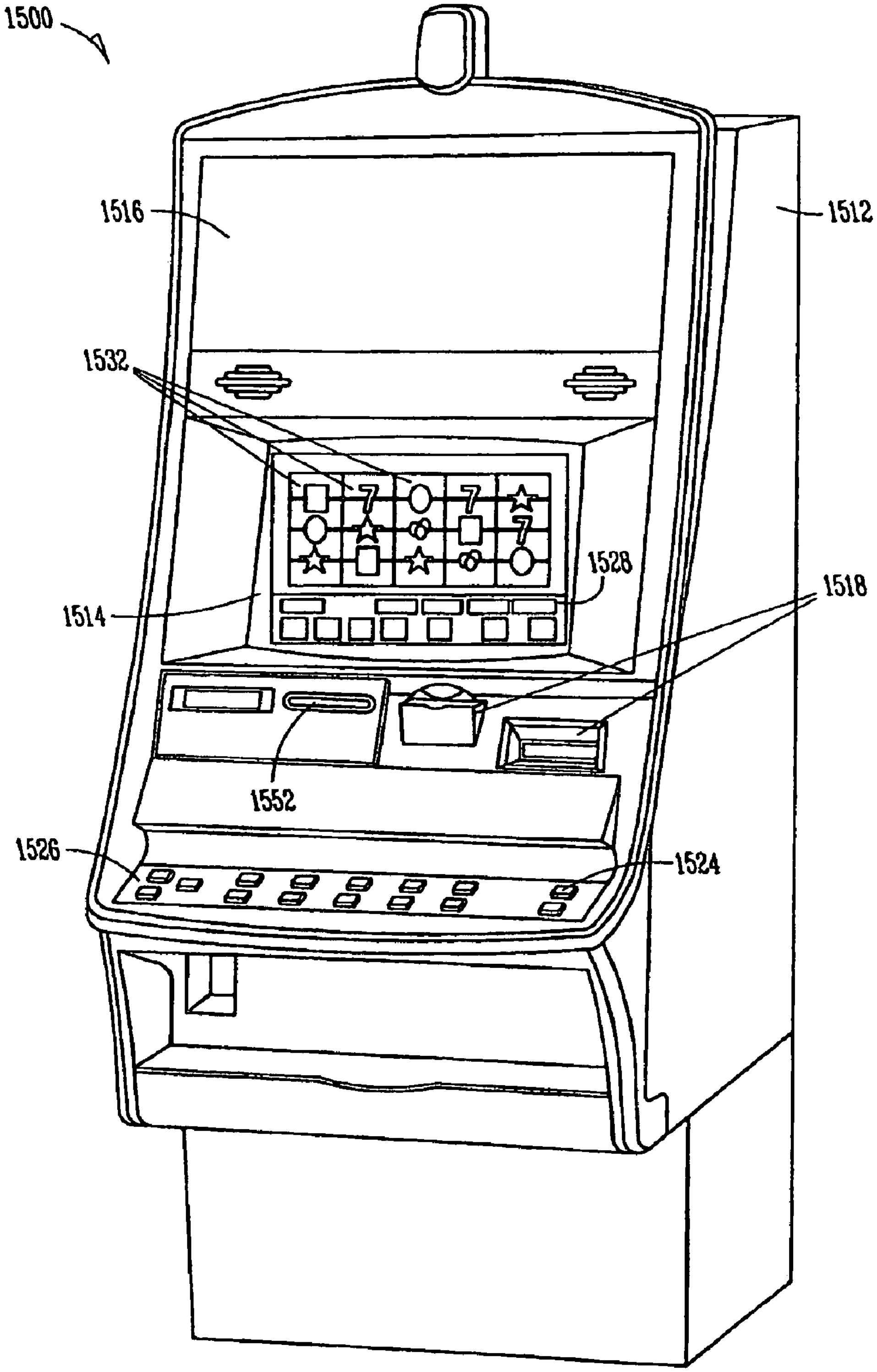
FIG. 15 is a perspective view of a wagering game machine, according to example embodiments of the invention.

FIG. 15 is a perspective view of a wagering game machine 1500, according to example embodiments of the invention. Referring to FIG. 15, a wagering game machine 1500 is used in gaming establishments, such as casinos. According to embodiments, the wagering game machine 1500 can be any type of wagering game machine and can have varying structures and methods of operation. For example, the wagering game machine 1500 can be an electromechanical wagering game machine configured to play mechanical slots, or it can be an electronic wagering game machine configured to play video casino games, such as blackjack, slots, keno, poker, blackjack, roulette, etc.

The wagering game machine 1500 comprises a housing 1512 and includes input devices, including value input devices 1518 and a player input device 1524. For output, the wagering game machine 1500 includes a primary display 1514 for displaying information about a basic wagering game. The primary display 1514 can also display information about a bonus wagering game and a progressive wagering game. The wagering game machine 1500 also includes a secondary display 1516 for displaying wagering game events, wagering game outcomes, and/or signage information. While some components of the wagering game machine 1500 are described herein, numerous other elements can exist and can be used in any number or combination to create varying forms of the wagering game machine 1500.

The value input devices 1518 can take any suitable form and can be located on the front of the housing 1512. The value input devices 1518 can receive currency and/or credits inserted by a player. The value input devices 1518 can include coin acceptors for receiving coin currency and bill acceptors for receiving paper currency. Furthermore, the value input devices 1518 can include ticket readers or barcode scanners for reading information stored on vouchers, cards, or other tangible portable storage devices. The vouchers or cards can authorize access to central accounts, which can transfer money to the wagering game machine 1500.

The player input device 1524 comprises a plurality of push buttons on a button panel 1526 for operating the wagering game machine 1500. In addition, or alternatively, the player input device 1524 can comprise a touch screen 1528 mounted over the primary display 1514 and/or secondary display 1516.

The various components of the wagering game machine 1500 can be connected directly to, or contained within, the housing 1512. Alternatively, some of the wagering game machine's components can be located outside of the housing 1512, while being communicatively coupled with the wagering game machine 1500 using any suitable wired or wireless communication technology.

The operation of the basic wagering game can be displayed to the player on the primary display 1514. The primary display 1514 can also display a bonus game associated with the basic wagering game. The primary display 1514 can include a cathode ray tube (CRT), a high resolution liquid crystal display (LCD), a plasma display, light emitting diodes (LED's), or any other type of display suitable for use in the wagering game machine 1500. Alternatively, the primary display 1514 can include a number of electromechanical reels to display the outcome. In FIG. 15, the wagering game machine 1500 is an "upright" version in which the primary display 1514 is oriented vertically relative to the player. Alternatively, the wagering game machine can be a "slant-top" version in which the primary display 1514 is slanted at about a thirty-degree angle toward the player of the wagering game machine 1500. In yet another embodiment, the wagering game machine 1500 can be a bartop model, handheld mobile unit, workstation-type console model, or the like.

A player begins playing a basic wagering game by placing a wager via the player input device 1524 and/or value input device 1518. The player can initiate play by using the push buttons or touch screen of the player input device 1524. The basic game can include arranging a plurality of symbols along a payline 1532, which indicates one or more outcomes of the basic game. Such outcomes can be randomly selected in response to player input. At least one of the outcomes, which can include any variation or combination of symbols, can trigger a bonus game.

In some embodiments, the wagering game machine 1500 can also include an information reader 1552, which can include a card reader, ticket reader, bar code scanner, RFID transceiver, or computer readable storage medium interface. In some embodiments, the information reader 1552 can be used to award complimentary services, restore game assets, track player habits, etc.

In an embodiment, the wagering game machine 1500 includes hardware or software to operate as a cashless wagering kiosk 310. For example, when not in game-play mode, the wagering game machine 1500 may accept a ticket, token, currency bill, or currency coin from a user using value input device 1518. The value associated with the value input may be credited or fund a cashless wagering account in one example. As another example, a using playing a wagering game machine 1500 that is associated with a cashless wagering system may choose to have a currency or currency substitute dispensed using some or all of the funds associated with the cashless wagering system. The currency substitute may include a form compatible with a different cashless wagering system than one associated with the wagering game machine 1500. In such configurations, the wagering game machine 1500 may operate as a cashless wagering system gateway device, bridging two or more different cashless wagering systems.

Figure 16:
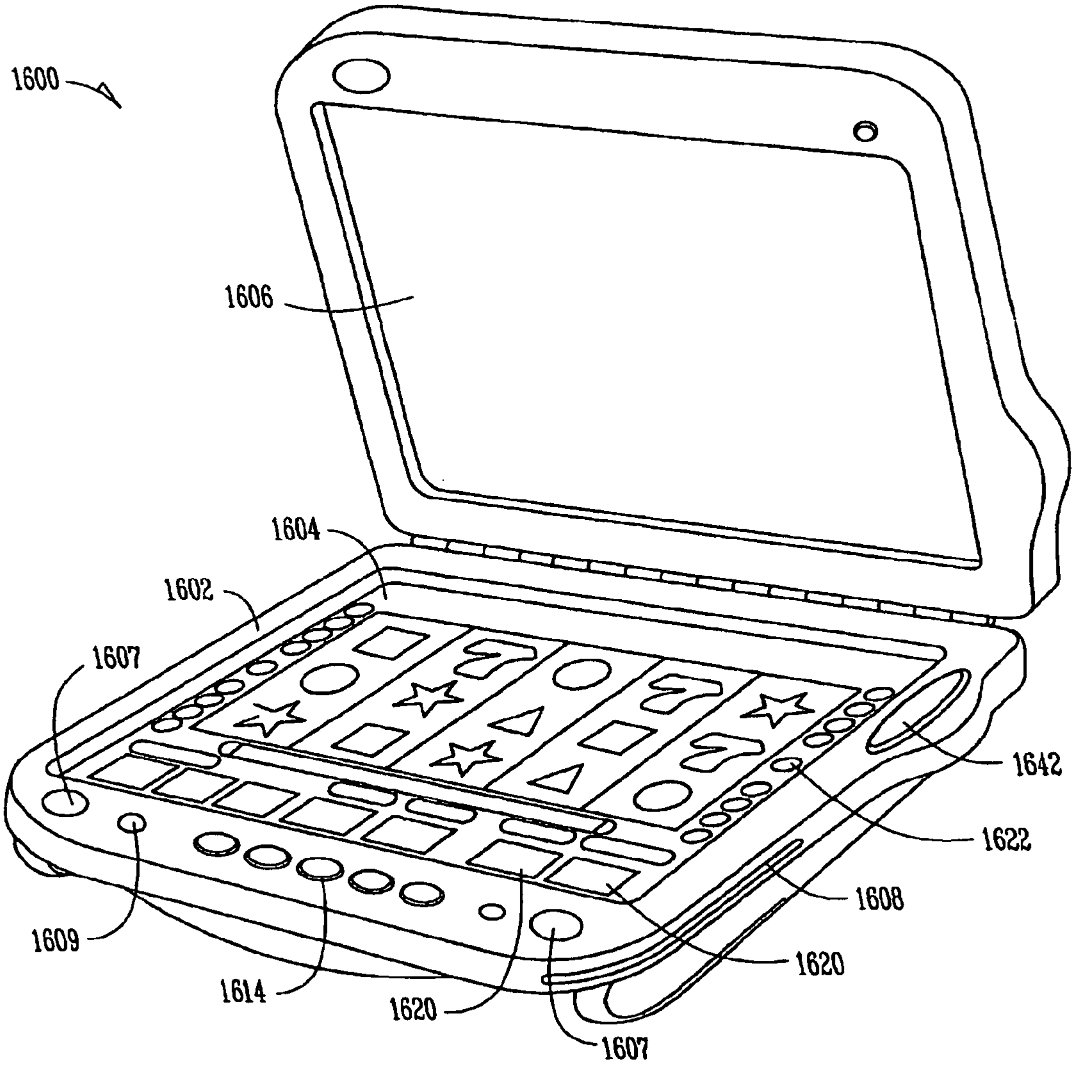
FIG. 16 is a perspective view of a mobile or handheld wagering game machine, according to example embodiments of the invention.

FIG. 16 is a perspective view of a mobile or handheld wagering game machine 1600, according to example embodiments of the invention. Like free standing wagering game machines, in a handheld or mobile form, the wagering game machine 1600 can include any suitable electronic device configured to play a video casino games such as blackjack, slots, keno, poker, blackjack, and roulette. In an embodiment, the portable wagering game machine 1600 includes a portable wagering tablet (PGT) device.

The wagering game machine 1600 may comprise a housing 1602 and include input devices, including a value input device 1608 and a player input device 1614. For output, the wagering game machine 1600 includes a primary display 1604, a secondary display 1606, one or more speakers 1607, one or more player-accessible ports 1609 (e.g., an audio output jack for headphones, a video headset jack, etc.), and other I/O devices and ports, which may or may not be player-accessible. In the embodiment depicted in FIG. 16, the wagering game machine 1600 comprises a secondary display 1606 that is rotatable relative to the primary display 1604. The optional secondary display 1606 can be fixed, movable, and/or detachable/attachable relative to the primary display 1604. Either the primary display 1604 and/or secondary display 1606 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 1608 can comprise, for example, a slot located on the front, side, or top of the casing 1602 configured to receive credit from a stored-value card (e.g., casino card, smart card, debit card, credit card, etc.) inserted by a player. The player-accessible value input device 1608 can also comprise a sensor (e.g., an RF sensor) configured to sense a signal (e.g., an RF signal) output by a transmitter (e.g., an RF transmitter) carried by a player. The player-accessible value input device 1608 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 1600.

Still other player-accessible value input devices 1608 can require the use of touch keys 1620 on the touch-screen display (e.g., primary display 1604 and/or secondary display 1606) or player input devices 1614. Upon entry of player identification information and, in some cases, secondary authorization information (e.g., a password, PIN number, stored value card number, predefined key sequences, etc.), the player can be permitted to access a player's account. As one potential optional security feature, the wagering game machine 1600 can be configured to permit a player to only access an account the player has specifically set up for the wagering game machine 1600. Other security features can also be utilized to, for example, prevent unauthorized access to a player's account, to minimize an impact of any unauthorized access to a player's account, or to prevent unauthorized access to any personal information or funds temporarily stored on the wagering game machine 1600.

The player-accessible value input device 1608 can itself comprise or utilize a biometric player information reader which permits the player to access available funds on a player's account, either alone or in combination with another of the aforementioned player-accessible value input devices 1608. In an embodiment wherein the player-accessible value input device 1608 comprises a biometric player information reader, transactions such as an input of value to the wagering game machine 1600, a transfer of value from one player account or source to an account associated with the wagering game machine 1600, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 1608 comprising a biometric player information reader can require a confirmatory entry from another biometric player information reader 1642, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 1608 can be provided remotely from the wagering game machine 1600.

The player input device 1614 comprises a plurality of push buttons on a button panel for operating the wagering game machine 1600. In addition, or alternatively, the player input device 1614 can comprise a touch screen mounted to a primary display 1604 and/or secondary display 1606. In one aspect, the touch screen is matched to a display screen having one or more selectable touch keys 1620 selectable by a user's touching of the associated area of the screen using a finger or a tool, such as a stylus pointer. A player enables a desired function either by touching the touch screen at an appropriate touch key 1620 or by pressing an appropriate push button on the button panel. The touch keys 1620 can be used to implement the same functions as push buttons. Alternatively, the push buttons 1614 can provide inputs for one aspect of the operating the game, while the touch keys 1620 can allow for input needed for another aspect of the game. The various components of the wagering game machine 1600 can be connected directly to, or contained within, the casing 1602, as seen in FIG. 16, or can be located outside the casing 1602 and connected to the casing 1602 via a variety of wired (tethered) or wireless connection methods. Thus, the wagering game machine 1600 can comprise a single unit or a plurality of interconnected (e.g., wireless connections) parts which can be arranged to suit a player's preferences.

The operation of the basic wagering game on the wagering game machine 1600 is displayed to the player on the primary display 1604. The primary display 1604 can also display the bonus game associated with the basic wagering game. The primary display 1604 may take the form of a high resolution LCD, a plasma display, an LED, or any other type of display suitable for use in the wagering game machine 1600. The size of the primary display 1604 can vary from, for example, about a 2-3" display to a 15" or 17" display. In at least some embodiments, the primary display 1604 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 1604 and/or secondary display 1606 can have a 16:9 aspect ratio or other aspect ratio (e.g., 4:3). The primary display 1604 and/or secondary display 1606 can also each have different resolutions, different color schemes, and different aspect ratios.

As with the free standing embodiments a wagering gaming machine, a player begins play of the basic wagering game on the wagering game machine 1600 by making a wager (e.g., via the value input device 1608 or an assignment of credits stored on the handheld gaming machine via the touch screen keys 1620, player input device 1614, or buttons 1614) on the wagering game machine 1600. In some embodiments, the basic game can comprise a plurality of symbols arranged in an array, and includes at least one payline 1622 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 1608 of the wagering game machine 1600 can double as a player information reader 1642 that allows for identification of a player by reading a card with information indicating the player's identity (e.g., reading a player's credit card, player ID card, smart card, etc.). The player information reader 1642 can alternatively or also comprise a bar code scanner, RFID transceiver or computer readable storage medium interface. In one embodiment, the player information reader 1642 comprises a biometric sensing device.

General Comments

In this detailed description, reference is made to specific examples by way of drawings and illustrations. These examples are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject herein, which is set forth in the following claims.

What is claimed is:

1. An apparatus comprising:

a housing comprising:

a first cashless wagering game media input device, operable to access a first cashless wagering game medium associated with a first cashless wagering system; and a second cashless wagering game media input device, operable to access a second cashless wagering game medium associated with a second cashless wagering system, the first cashless wagering game medium being different from the second cashless wagering game medium, the first cashless wagering system being different from the second cashless wagering system, the first and second cashless wagering game systems coupled over a network; and a control module operable to:

debit a transfer amount from the first cashless wagering system using the first cashless wagering game medium; and credit at least a portion of the transfer amount from the first cashless wagering system to the second cashless wagering system using the second cashless wagering game medium, wherein the debit and credit occur in a single transaction.

2. The apparatus of claim 1, wherein the control module is further operable to provide a side game, the side game including a randomly selected outcome.

3. An apparatus comprising:

a housing comprising:

a control module operable to receive a wager in association with a wagering game;

a first cashless wagering game media input device, operable to access a first cashless wagering game medium associated with a first cashless wagering system; and a second cashless wagering game media input device, operable to access a second cashless wagering game medium associated with a second cashless wagering system, the first cashless wagering game medium being different from the second cashless wagering game medium, the first cashless wagering system being different from the second cashless wagering system, the first and second cashless wagering game systems coupled over a network;

wherein the control module further operable to:

debit a transfer amount from the first cashless wagering system using the first cashless wagering game medium; and credit at least a portion of the transfer amount from the first cashless wagering system to the second cashless wagering system using the second cashless wagering game medium, wherein the debit and credit occur in a single transaction.

4. The apparatus of claim 3, wherein the control module is configured to operate in one of a game-play mode or a cashless wagering system gateway mode.

5. A method comprising:

debiting the first cashless wagering system a debit amount using a first cashless wagering game medium associated with a first cashless wagering system, the debit amount being related to a transfer amount; and crediting the second cashless wagering system a credit amount using a second cashless wagering game medium associated with a second cashless wagering system, the credit amount being related to the transfer amount, wherein the first cashless wagering game medium is different from the second cashless wagering game medium, the first cashless wagering system is different from the second cashless wagering system, the first and second cashless wagering game systems coupled over a network;

wherein the debiting and crediting occur in a single transaction.

6. The method of claim 5, wherein the first cashless wagering system includes a ticket-in/ticket-out (TITO) system, an account-based system, or a pre-paid card system.

7. The method of claim 5, wherein the second cashless wagering system includes a ticket-in/ticket-out (TITO) system, an account-based system, or a pre-paid card system.

8. The method of claim 5, wherein the first cashless wagering system is associated with a first set of cashless wagering games, and wherein the second cashless wagering system is associated with a second set of cashless wagering games.

9. The method of claim 8, wherein the first set of cashless wagering games and the second set of cashless wagering games are mutually distinct.

10. The method of claim 5, further comprising:

dispensing a cashless wagering system media, the cashless wagering system media associated with the second cashless wagering system and to include at least the portion of the transfer amount.

11. The method of claim 5, wherein the credit amount is different than the transfer amount.

12. The method of claim 11, wherein the credit amount is increased as a result of a promotional game, a side game, or a bonus game.

13. The method of claim 11, wherein the credit amount is reduced as a result of one or more transaction costs, wherein the transaction costs are costs associated with the transfer of the amount to be transferred from the first cashless wagering system to the second cashless wagering system.

14. A non-transitory machine-readable medium comprising instructions, which when executed by a machine, cause the machine to:

debit the first cashless wagering system a debit amount using a first cashless wagering game medium associated with a first cashless wagering system, the debit amount being related to a transfer amount; and credit the second cashless wagering system a credit amount using a second cashless wagering game medium associated with a second cashless wagering system, the credit amount being related to the transfer amount, wherein the first cashless wagering game medium is different from the second cashless wagering game medium, the first cashless wagering system is different from the second cashless wagering system, the first and second cashless wagering game systems coupled over a network;

wherein the debit and credit occur in a single transaction.

15. The non-transitory machine-readable medium of claim 14, wherein the first cashless wagering system includes a ticket-in/ticket-out (TITO) system, an account-based system, or a pre-paid card system.

16. The non-transitory machine-readable medium of claim 14, wherein the second cashless wagering system includes a ticket-in/ticket-out (TITO) system, an account-based system, or a pre-paid card system.

17. The non-transitory machine-readable medium of claim 14, wherein the first cashless wagering system is associated with a first set of cashless wagering games, and wherein the second cashless wagering system is associated with a second set of cashless wagering games.

18. The non-transitory machine-readable medium of claim 17, wherein the first set of cashless wagering games and the second set of cashless wagering games are mutually distinct.

19. The non-transitory machine-readable medium of claim 14, further comprising instructions, which when executed by the machine, cause the machine to:

dispense a cashless wagering system media, the cashless wagering system media associated with the second cashless wagering system and to include at least the portion of the transfer amount.

20. The non-transitory machine-readable medium of claim 14, wherein the credit amount is different than the transfer amount.

21. The non-transitory machine-readable medium of claim 20, further comprising instructions, which when executed by the machine, cause the machine to increase the credit amount as a result of a promotional game, a side game, or a bonus game.

22. The non-transitory machine-readable medium of claim 20, further comprising instructions, which when executed by the machine, cause the machine to reduce the credit amount as a result of one or more transaction costs, wherein the transaction costs are costs associated with the transfer of the amount to be transferred from the first cashless wagering system to the second cashless wagering system.

* * * * *